United States Patent [19]

Marshall et al.

[11] 3,773,682

[45] Nov. 20, 1973

[54] PRODUCTION OF METAL-CONTAINING MATERIALS BY GEL-PRECIPITATION

[75] Inventors: Alan Marshall, Beckermet; Geoffrey Alan Holburt, Seascale; Edward Sydney Lane, Didcot, all of England

[73] Assignee: United Kingdom Atomic Energy Authority, London, England

[22] Filed: Jan. 27, 1972

[21] Appl. No.: 221,439

[30] Foreign Application Priority Data

Feb. 1, 1971  Great Britain..................... 3,632/71

[52] U.S. Cl. ............ 252/301.1 S, 264/0.5, 252/317
[51] Int. Cl............................................. C09k 3/00
[58] Field of Search................ 252/301.1 R, 301.1 S, 252/317; 264/0.5

[56] References Cited

UNITED STATES PATENTS

| 3,495,954 | 2/1970 | Grimes et al. ............... 252/301.1 X |
| 3,397,257 | 8/1968 | Brambilla et al. .................... 264/0.5 |
| 3,535,264 | 10/1970 | Hackstein et al. ............... 252/301.1 |
| 3,401,122 | 9/1968 | Cogliati et al. .................. 252/301.1 |
| 3,235,326 | 2/1966 | Slooten............................ 252/301.1 |

OTHER PUBLICATIONS

Iskhakoua et al., "Gelation of Silica Gels in the Presence of Polyelectrolytes", Chem. Abst., Vol. 72, 1970, p. 45. (No. 79979u)

*Primary Examiner*—Carl D. Quarforth
*Assistant Examiner*—R. L. Tate
*Attorney*—Roberts B. Larson et al.

[57] ABSTRACT

In a gel-precipitation process for the production of ceramic microspheres a solution containing a metal salt is mixed with a polyacrylamide compound which acts as a gelating agent and with formamide which acts as a modifying agent to form a homogeneous mixture which is introduced drop-wise into an aqueous alkaline solution in which the drops are converted individually into solid gel spheres.

8 Claims, No Drawings

PRODUCTION OF METAL-CONTAINING MATERIALS BY GEL-PRECIPITATION

BACKGROUND OF THE INVENTION

This invention relates to the production of metal-containing materials by gel-precipitation and has one application in the production of particles of the oxides or carbides of metals such as uranium for use as nuclear reactor fuels.

In known gel-precipitation processes microspheres of ceramic oxides are produced when a solution (which may be an anion deficient solution) of at least one metal salt is mixed with a water soluble compound, usually of high molecular weight (referred to as the gelating agent) and introduced in the form of drops into an aqueous alkaline solution so that the drop is converted into a solid gel which preserves its shape through subsequent washing, drying and calcination stages.

Further there has been disclosed the use as gelating agents of polymeric compounds containing polyhydroxy, polycarboxylic and polyamine groups, and soluble in the metal salt solution.

SUMMARY OF THE INVENTION

According to the present invention a gel precipitation process for the production of ceramic microspheres includes the steps of mixing a solution of at least one metal salt with a gelating agent comprising a polyacrylamide compound and with a modifying agent consisting essentially of formamide to produce a homogenous mixture and introducing drops of the mixture into an aqueous alkaline solution such that the drops are converted individually into solid gel spheres.

Polyacrylamide is a polymeric compound containing carbonamide groups, which is particularly effective as a gelating agent. There are many commercial preparations which contain polycarbonamide groups available for use in other industries as flocculating agents. Sometimes these contain copolymers of acrylamide with other, often unspecified, compounds. Such products may be used in the process of the invention provided that they are compatible with the solutions of the metals used. Other gelating agents may also be used in conjunction with the polyacrylamide. A particularly satisfactory organic polymeric material is considered to be Superfloc 16 which is polyacrylamide of average molecular weight $4 \times 10^6$ marketed by Cyanamid of Great Britain Ltd. Another satisfactory material is Versicol W17 which is a 12.5 percent solution in water of a polymer based on polyacrylamide, marketed by the Allied Colloids Manufacturing Co. Ltd. of Bradford, England. It is particularly suitable for the preparation of the smaller sizes of spheres (100–200 $\mu$ diameter) by vibrating jet systems.

In gel-precipitation processes it is customary to add compounds to the mixed metal and gelating agent solution in order to modify the properties of the mixture so as to obtain better drop sphericity and to preserve their shape and integrity during subsequent stages of the process. We have found that formamide is required in combination with polyacrylamide for satisfactory sphere production. It is generally advantageous to add the polyacrylamide in the form of a solution in formamide and water. Addition of polyacrylamide in the form of its aqueous solution is also sometimes possible. Addition in the form of a solution in aqueous formamide is preferred however as these solutions have a lower viscosity than corresponding aqueous systems. The polyacrylamide may also be added as a solution in formamide but this is not favoured because the rate of solution is formamide alone is excessively slow.

Carbon may be added to the mixture before precipitation with the objects of either (a) converting precipitated oxide to carbide by heating in an inert atmosphere at an elevated temperature, or (b) forming a sphere intimately mixed with carbon and subsequently removing the carbon particles by heating in an oxidising atmosphere to form a porous sphere.

The process of the invention is considered of general application where solutions of a metal salt produce a homogenous mixture with the polyacrylamide compound and formamide. It has however been found particularly useful for the manufacture of urania, plutonia and thoria microspheres, or mixtures thereof. The present invention is illustrated but not limited by the following examples:

EXAMPLE 1

An anion-deficient solution of uranium-20 percent thorium nitrates is prepared as follows: 248.2 g thorium nitrate hexahydrate, 115.4 ml of 16 molar nitric acid are mixed and dissolved in water to give a total weight of 650 g. 260 g of this solution is mixed with 60 ml water, 196 g uranium trioxide (obtained by thermal denitration of uranyl nitrate) and 11.5 ml of 16 molar nitric acid and stirred at 90°–95°C. The last traces of oxide are dissolved by the addition of 5 ml of glacial acetic acid, and the mixture is adjusted with water to a total weight of 522 g. The anion to metal molar ratio of this solution is approximately 2.

0.5 g of finely powdered polyacrylamide was added to 27 g of the above solution and 10 ml of formamide. The mixture was stirred for 3 hours at room temperature during which time the polyacrylamide dissolved to give a clear solution which was adjusted to a total volume of 40 ml. The mixture was added dropwise to 500 ml of stirred ammonia (0.880 S.G.) in which the spheres produced were allowed to stand for a minimum of one hour. They were collected, washed with 10 bed volumes of water and dried by heating to 200°C in steam (200 g per hour) for 45 minutes. The dried gel spheres were heated to 900°C (50° per hour) and then in hydrogen to 1,450°C (100° per hour). The calcined spheres had a density of 97.7 percent of the theoretical density.

EXAMPLE 2

An anion deficient solution of uranium-20 percent plutonium nitrate was made up as follows: 9.02 g of a solution containing 223 mg total plutonium per g of solution was dispensed into a beaker fitted with a stirrer. The valency states of the plutonium were as follows:

99.5% Pu (IV)

0.2% Pu (VI)

0.2% Pu (III)

and the free nitric acid in the solution was such that 1 g of the solution was equivalent to 3.13 ml of molar sodium hydroxide solution. 9.86 g of uranium trioxide was added, followed by 0.5 ml of 16 molar nitric acid in 10 ml of water. The mixture was stirred for 4 hours at room temperature forming a dark orange brown solution with a nitrate to metal ratio of approximately 1.7. 10 ml of formamide was added and 0.9 g Superfloc 16 Flocculant and the mixture stirred for 8 hours. The viscous solution was then diluted to a volume of 40 ml with 1.5 ml of glacial acetic acid and water. This mixture was added dropwise to 250 ml of stirred ammonia (0.880 S.G.) and the gel spheres allowed to stand therein for a minimum of one hour. They were then removed, washed with water and heated at 100°C in water for 30 minutes, drained and allowed to dry in trays in air at room temperature. When calcined according to the schedule given in Example 1 the density obtained was 93 percent of theoretical.

EXAMPLE 3

25 g of Polyflok PX was mixed into 37.5 ml of water in a beaker fitted with a stirrer. (Polyflok PX is made by Yorkshire Dyeware and Chemical Co. It is a 10 percent solution in water of a nonionic polymer, principally polyacrylamide, said to have a molecular weight of $2 \times 10^6$ and to contain large numbers of reactive amide groups throughout the length of the polymer chain). To the mixture was added 37.5 ml of a solution containing uranyl nitrate wherein the uranium content of the solution was 400 g/l and the free nitric acid was 75.6 g/l (1.2M). The mixture was stirred for 30 minutes then left to stand at ambient temperatures for 30 minutes. The viscous solution resulting was then added dropwise into 3 litres of ammonia solution (SG.880) contained in a glass vessel 28 inches high and 3 inches internal diameter fitted with a large bore glass stopcock on its base.

The gel spheres produced were left in the base of this vessel for 24 minutes before transfer via the stopcock to a beaker, draining and washing with five bed volumes of cold water (20°C). The gel spheres were then placed in trays and the surplus liquor removed and the spheres were dried in air at room temperature (24°C).

The dried gel spheres were heated to 800°C in a stream of pure $CO_2$; the heating rate was 50°C/hr. The partially calcined spheres were transferred to a sintering furnace and heated in a 4 percent hydrogen/argon mixture to 1,650°C at 100°C/hr. The furnace was maintained at 1,650°C for 2 hrs before cooling to room temperature. The spheres had a density of 97 percent of the theoretical density.

EXAMPLE 4

25 g of Polyflok PX was mixed with 25 ml of cold water in a beaker fitted with a stirrer. 50 mls of a uranyl nitrate solution containing 400 g/l of uranium and having a free nitric acid concentration of 75.6 g/l was placed in a beaker and 3 g of Wisprofloc P (a starch based flocculating agent marketed by Yorkshire Dyeware and Chemical Co. Ltd.) was added slowly with vigorous stirring during the addition of the powder. The latter solution was left standing without agitation for 12 minutes and was then added while stirring to the Polyflok PX solution. The mixed solution was continuously stirred for 30 minutes and then left to stand for a further 30 minutes.

This viscous mixture was added dropwise into 3 litres of ammonia solution (0.880 S.G.) contained in a glass vessel 28 inches high and 3 inches diameter. The gel spheres produced were left in the base of the column for 30 minutes before transfer to a beaker. The gel-spheres were then drained, washed with 6 bed volumes of warm water (50°C) and dried in air.

The dried gel-spheres were heated to 800°C in a stream of pure $CO_2$; the rate of heating was 50°C/hr and the maximum temperature was maintained for four hours. The partially calcined spheres were sintered in a stream of flowing 4 percent hydrogen/argon at 1,650°C for a period of 4 hours. The sintered spheres had a density of 94.3 percent of the theoretical density.

EXAMPLE 5

4.2 g of $UO_3$ was dissolved in 6.88 g plutonium nitrate solution (1 g solution = 217 mg Pu = 3.0 ml 1 M NaOH) containing 0.25 ml glacial acetic acid. A mixture of 2.5 g of Versicol W17, 1.4 g of monoethanolamine and 17.5 ml of water was added dropwise with stirring and the total volume of the mixture was made up to 30 ml with water.

This feed solution was pumped at 2–3 ml per minute through a jet diameter 0.003 inches, vibrated at 110 cycles/second. The jet fed the drops through a Perspex cyclinder, 4.5 inches in diameter, 10 inches long which served as an air shroud to prevent movement of the stream of drops due to extraneous air currents. 15 inches below the jet the stream of drops entered the gelation column which was square sectioned, 8 inch side, and 16 inches high, constructed of Perspex. At the base of the gelation column a cylindrical dish containing 0.880 S.G. ammonia (1.5 litres) to a depth of 2 inches served to complete the gelation of the droplets and to contain the gel spheres. From the base of the gelation column and over the surface of the ammonia a stream of ammonia gas was passed at 1–2 litres per hour. The gelled spheres were allowed to stand in the ammonia for 30 minutes then washed in 5 volumes of cold water, followed by steaming for a further 20 minutes with steam at atmospheric pressure. The drained spheres were then azeotropically dried in a chlorinated hydrocarbon and the excess solvent allowed to evaporate in a current of air. The dry spheres were heated in a 2 inch diameter tube furnace in an atmosphere of carbon dioxide (2 litres per minute) in alumina boats. The heating programme was 50°C per hour to 850°C, hold for 3 hours and cool in the same atmosphere (12 hours from peak temperature). The furnace atmosphere was then changed to argon 4 percent hydrogen (5 litres per minute) and heated at 100° per hour to 1,550°C, held for 2 hours and allowed to cool in the same atmosphere (12 hours from peak temperature). The calcined spheres (about 0.150 $\mu$ diameter) had a density of greater than 97 percent of the theoretical.

EXAMPLE 6

Uranyl nitrate hexahydrate (85.08 g) was dissolved in water containing 9.4 ml nitric acid and 2.0 ml glacial acetic acid. A mixture of 24 g Versicol W 17 and 100 ml of formamide was added, followed by the dropwise addition of monoethanolamine (8.8 g) in formamide (40 ml). 30.5 g of a 20 percent carbon dispersion in water was stirred into the mixture which was adjusted to a total volume of 240 ml by the addition of water. This mixture was streamed through a 0.005 in. diameter jet in the apparatus described in Example 5. The resulting gel spheres were washed, steamed and dried in a current of air at room temperature. They were debonded in argon at 850°C (peak temperature) then heated to 1,800°C in a Stokes vacuum furnace for 5 hours. The resulting uranium carbide spheres were 150

– 300 μ diameter and contained 4.97 percent carbon and 0.12 percent of oxygen.

EXAMPLE 7

9.86 g of uranium trioxide was dissolved in 9.0 g of a plutonium nitrate solution (1 g = 221.4 mg Pu = 3.2 ml of 1 M NaOH) to which had been added 1.9 ml of nitric acid and 0.5 ml of glacial acetic acid. 10 ml of water and 20 ml of formamide was added and 0.4 g of powdered Superfloc 16 was stirred in until dissolved. 7.85 g of a 20 percent carbon dispersion in water was added and the mixture stirred until sufficiently mobile for facile drop formation. It was gelled as in Example 4 and the spheres washed in cold water and then heated to 100° by injection of steam at atmospheric pressure for 30 minutes. The drained spheres were dried in air and debonded by slowly heating in argon to a peak temperature of 850°C. Their carbon content was then 11.4 percent by weight. The debonded spheres were heated in a stream of argon and held at 1,450°C for 22 hours. They were then sintered by heating in vacuo for a further 1.5 hours at 1,600°– 1,850°C. The resulting spheres, about 400 μ diameter, had a mercury density of 88.9 percent of the theoretical and the following analysis:

Carbon = 4.62%

Oxygen = 0.07%

Nitrogen = 0.01% by weight.

EXAMPLE 8

0.7 ml of 9.7 molar ammonium hydroxide was added to 27.3 g of a plutonium nitrate solution (1g = 183 mg Pu = 2.85 ml 1M NaOH) with stirring. 20 ml of a solution made by dissolving 3 g of Superfloc 16 in a mixture of water (20 ml) and formamide (80 ml) was stirred in. This mixture was now added dropwise to 0.880 s.g. ammonia (1 litre) and the gel spheres aged therein for 1 hour. They were washed in cold water, heated for 2 hours by injection of steam at atmospheric pressure and tray dried in air. They were debonded in air at 500°C (50°C per hour increase) then sintered in argon- 4 percent hydrogen at 1,500°C (100°C per hour increase). The resulting plutonium dioxide spheres had a mercury density of 95.5 percent of the theoretical.

We claim:

1. In a gel precipitation process for the production of ceramic microspheres the steps of mixing a solution of at least one metal salt with a gelating agent comprising a polyacrylamide compound and with a modifying agent consisting essentially of formamide, to produce a homogenous mixture and introducing drops of the mixture into an aqueous alkaline solution such that the drops are converted individually into solid gel spheres.

2. A gel precipitation process as claimed in claim 1 wherein the solution of at least one metal salt comprises uranium nitrate.

3. A gel precipitation process as claimed in claim 1 wherein the solution of at least one metal salt comprises plutonium nitrate.

4. A gel precipitation process as claimed in claim 2 wherein the solution also includes thorium nitrate or plutonium nitrate.

5. A gel precipitation process as claimed in claim 1 wherein carbon is added to the mixture before introduction into the aqueous alkaline solution.

6. A gel precipitation process as claimed in claim 1 wherein the polyacrylamide compound has an average molecular weight of $4 \times 10^6$.

7. A gel precipitation process as claimed in claim 1 wherein the solution of at least one metal salt is anion-deficient.

8. A gel precipitation process as claimed in claim 1 wherein a further gelating agent is included in addition to the polyacrylamide compound.

* * * * *